Patented Aug. 14, 1934

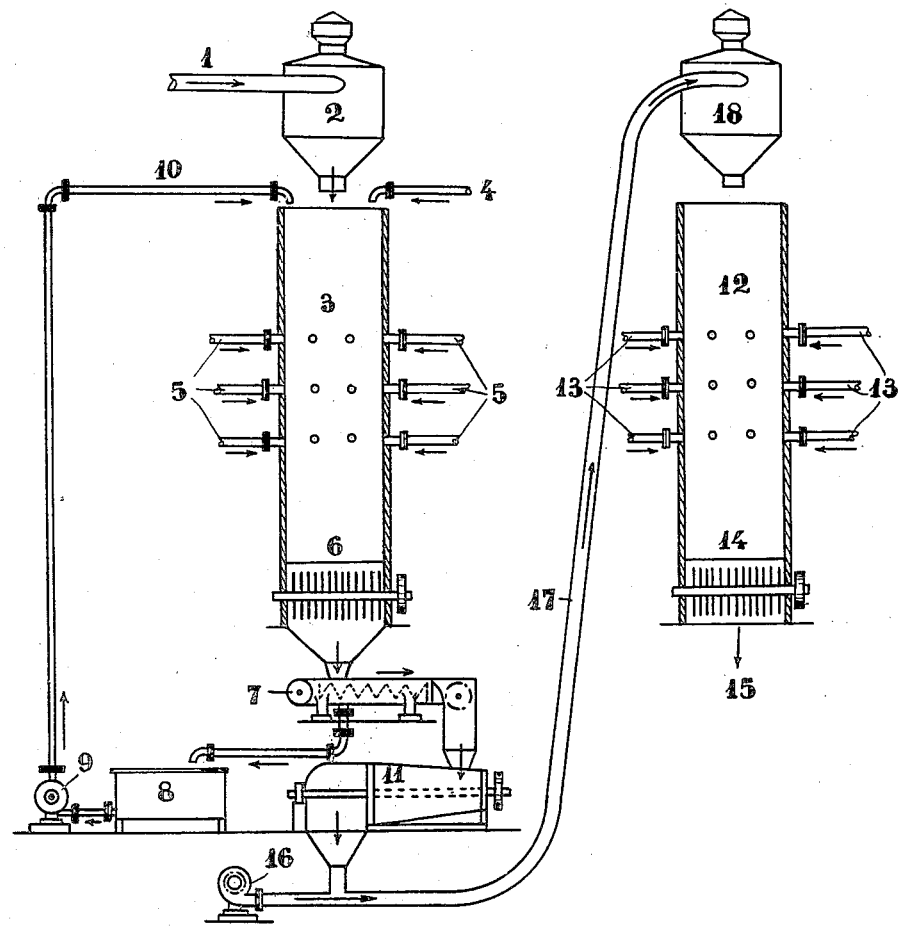

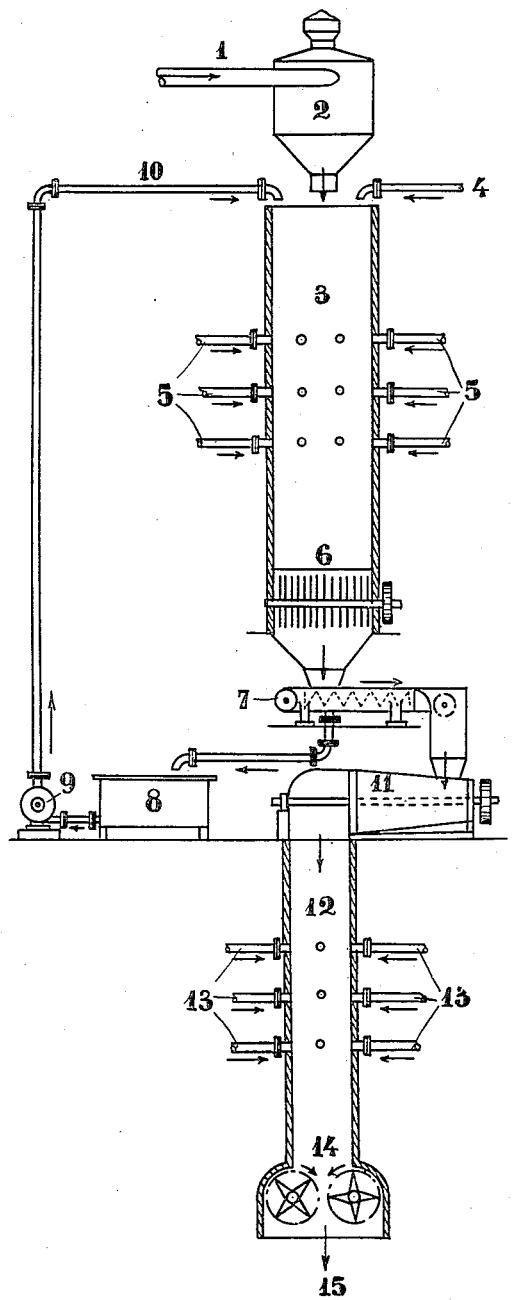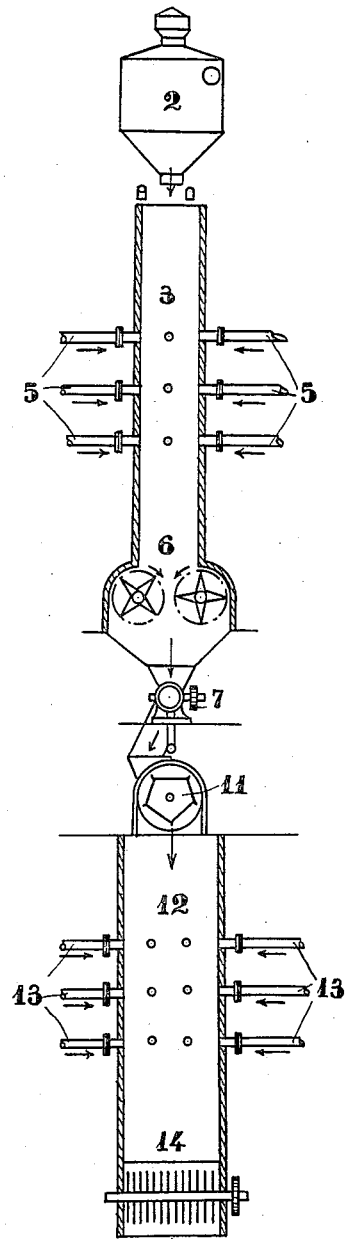

UNITED STATES PATENT OFFICE 1,970,148

PROCESS FOR THE CONTINUOUS TREATMENT OF VEGETABLES WITH SODA AND GASEOUS CHLORINE FOR THE INDUSTRIAL PRODUCTION OF CELLULOSE

Umberto Pomilio, Naples, Italy, assignor to Alessandro Pomilio, Francavilla al Mare, Italy Application May 19, 1933, Serial No. 671,800
In Italy June 10, 1932

3 Claims. (Cl. 92—16)

The extraction of cellulose from vegetables by treating them with chlorine gas, after having previously treated the vegetables in alkaline baths having a moderate concentration and temperature, allows to obtain in laboratory tests, such satisfactory results as to induce the conviction that the process above mentioned is the only one which in actual practice is capable of attaining theoretical efficiency and of producing pure cellulose.

However, when operating on a large scale or in the conditions required on an industrial scale, various difficulties and inconveniences arise, some of which being of a serious nature, which up to now it has been impossible to eliminate; one of such being, for example, the difficulty of regulating the action of the reagents, and more especially of the chlorine which is highly corrosive and consequently deleterious for most of the materials with which the apparatus may be constructed; another being the difficulty of limiting the quantities of the reagents to those which are theoretically necessary to accomplish the reactions desired, and lastly the difficulty of preventing losses owing to the gaseous nature of the reagents.

The above said difficulties and inconveniences may however be eliminated by adopting the process forming the object of the present invention, said process having been elaborated after a long series of careful tests on a large scale, the result of said tests having evolved a continuous process based on the operation by gravity of all the apparatus used in the process from the mechanical and chemical standpoint, the gravity being used to produce the progressive descent of the vegetable material treated in continuous working apparatuses either for impregnation or for chlorination, the velocity of said advancement being controlled as desired by means of suitable controlling devices applied to the exit openings or discharge outlets of the various apparatus.

A general arrangement which is applicable in practice both for apparatus for alkaline impregnation and for chlorinating apparatus is described hereinunder: A vertical tower, made with a material suitable to withstand the action of hot diluted alkali or of moist chlorine gas, is made with a sufficient height so that during the passage through it of the reagents, the reaction may have time to be accomplished, is provided at suitable places on its side walls with means for introducing therein the reagents or physical agents adapted to produce the changes in the treated materials, viz, by introducing alkali and vapour into the impregnating towers, and chlorine gas, and eventually a refrigerating mixture into the chlorinating towers.

The vegetable material to be treated is charged into the said towers in their upper part, and is withdrawn at their lower part, which latter openings being provided with extracting devices suitable for regulating the descent of the vegetable material, this descent occurring owing to its weight or gravity.

In the accompanying drawings are shown schematically by way of example two arrangements of a plant suitable for carrying out the process in a continuous manner according to the invention.

In the drawings:

Figure 1 shows the towers arranged at the same level.

Figures 2 and 3 show respectively two sectional elevations of a plant in which one tower is superposed to the other tower. Referring to the figures, the plant comprises two towers 3 and 12, the first of which, 3, is adapted for the alkali impregnation and the second tower, 12, for the chlorination, showing also their connections and the direction followed by the materials under treatment. The respective height of each tower is such that the reactions taking place within them are effected in a complete manner during the passage through them of the mass undergoing treatment. The first tower is formed with a material suitable to withstand the action of hot diluted alkali, and the second with a material that can resist the action of damp chlorine gas.

On the side walls of towers 3, and at a convenient height thereon the tubes 5 are provided for the inlet and control of the steam admitted. The top of the tower is provided with an opening for charging therein the finely minced vegetable material delivered thereto from the conveyor 1 and charging hopper 2, the clear alkaline lye being delivered to the tower through the pipe line 4. The lower part of the tower 3 is provided with a controlling extractor device 6 controlling the delivery speed of the cellulose material treated, which falls to the bottom outlet opening of the tower on to a horizontal conveyor-separator 7, from which it falls by means of a chute to a stuff-opener 11, and thence into a conveyor 17, by means of which it is conveyed to the charging hopper 18, feeding the chlorinating tower, by the air pressure produced by the fan 16. In the horizontal conveyor 7, the material is soaked with the lye, and the excess lye is withdrawn from the bottom of the said container and passes through a settling tank 8 to a lift pump 9, by means of a delivery pipe line 10 returns to the top of the tower 3 wherein it mixes with the fresh lye arriving through the line 4 as hereinbefore described.

From the charging or distributing hopper 18 the material is introduced to the top of the chlorinating tower 12. In an alternative arrangement shown in Figures 3 and 4, the tower 3 may be placed above the tower 12, in which case the lift duct 11 can be omitted. The tower 12 is also provided along its sides with the inlet ducts 13 serving for admitting and controlling thereto the chlorine, and at its bottom end it is provided with a controlling extractor device 14 for regulating the speed of delivery of the treated mass discharged through outlet opening 15.

It will be noticed that the two control devices 6 and 14 allow the speed of descent of the material to be varied as desired thus regulating the time in which the material under treatment remains in the respective towers, in order to suit the requirements of its particular nature.

The specific weight of the material under treatment will increase as it descends through the tower from top to bottom, said increase being produced both by the weight of the overlying material and by the action of the reagents which cause the underlying material to be softened and condensed.

For this reason, the upper layers of material in the towers are in a soft and open state, which represent the best conditions for coming into intimate contact with the reagents used, while the lower layers consist of condensed, compact and compressed material forming an almost impermeable bottom which prevents or retards the outlet of the reagents from the tower, so that when the steam is introduced in the first tower 3 and the chlorine gas is introduced into the second tower 12 up to a certain height, they can only direct themselves upwards, viz: in counter current with the vegetable material descending by gravity, consequently the spongy and open fresh vegetable material arriving continuously into the tower is readily absorbed, while the material descending by gravity through the bottom in both towers is thoroughly mixed uniformly.

The cross section of the towers, more especially in installations designed for a large production, may preferably be rectangular or elliptical, so as to reduce the thickness of the mass in treatment, and to facilitate the uniform penetration of the reagents therein.

The continuous advancement by gravity in the chlorinating tower, when properly effected and controlled, reduces to a minimum the quantity of the reagent which is not utilized, viz. the ratio between the industrial and the theoretical amounts of reagents required, as the countercurrent causes the more diluted or weak reagent to come into contact with the fresh virgin material which is more readily reacted upon, and when the continuous operation is once satisfactorily regulated, it will go on uniformly without incurring losses of reagents.

It is moreover obvious that as the tower apparatus described for the two operations required, eliminates the necessity of using costly horizontal conveyors for the material undergoing treatment, and allows the control of both the velocity of delivery or descent of the vegetable material in both towers and of the concentration and admission of the reagents therein. It is therefore possible to produce by means of the described process the most varied types of cellulose, both pure or crude, or finished cellulose paste or half stuff, and also to vary the quality of the vegetable material, without interrupting the operation of the plant. The continuous operation by gravity, as described, simplifies to the maximum possible extent the apparatus, which are reduced to simple towers, the only mechanical parts required, being also of a simple character, consisting only of the extracting control devices 6 or 14 at the bottom part of the towers.

The above described simplification prevents stoppages and blockages which occur frequently in all apparatus of a mechanical or continuous type which have been proposed or adopted up to the present for the treatment of vegetable materials, which owing to their generally fibrous nature are apt to block the machinery.

The continuous operation for the production of cellulose, facilitates also the uniform and regular production both of the alkali and of the chlorine by electrolysis, by using up these chemicals as fast and at the same rate at which they are produced.

It is well known that the necessary condition for operating satisfactorily electrolytic apparatus consists in the use of a constant amperage of the current and of the continuity of the run, thus obtaining a constant and uninterrupted production of alkali and of chlorine, this latter product, in a gaseous and damp state, being almost impossible to be stored industrially, the only possibility of its industrial utilization being that of using it at the same rate and uniformity at which it is produced, as occurring in the process of chlorinating the vegetable material in the manner aforesaid.

The apparatus working continuously and operated by gravity, as described, have also the advantage of reducing to a minimum the employment of hand labour, of service and of supervision, and are economically convenient for the production of cellulose, also with small sized units, which on account of the complex character of the modern cellulose producing installations were condemned to disappear thus preventing the utilization, in many places, of the local resources of vegetable material.

Lastly, in the cellulose plant above described, the relative quantity of reagent that is not consumed is reduced to a minimum quantity, the residual lye containing such small quantities of reagents that their recovery may be neglected, this fact causing a further reduction of installation and of working expenses.

I claim:

1. Process for the continuous treatment of vegetable material for the purpose of extracting finished cellulose or half paste therefrom on an industrial scale, which consists in introducing the vegetable material in minced form at the top of an impregnation tower and causing the material to descend by gravity therethrough while simultaneously exposing said material to the action of steam by causing the steam to rise upward in the upper portion of said tower through the mass of descending material, and subsequently introducing the initially treated material at the top of a second or chlorinating tower and causing said material to descend by gravity therethrough while exposing the descending mass to the action of chlorine gas rising upward in counter current through the mass in the upper portion of said chlorinating tower by introducing the chlorine gas into said second tower at a point about one third of the height thereof from the top of the same.

2. Process according to claim 1, wherein the alkaline lye containing fresh lye is introduced at the top of the impregnating tower and the steam is introduced intermediately between the top and bottom of said tower, the excess lye not absorbed in the reaction is recovered and recirculated in said tower by introducing said excess lye together with the fresh lye at the top of the tower, while the initially treated vegetable material which has descended therethrough is introduced at the top of the chlorinating tower and exposed therein to the action of the chlorine gas while descending through the upper third of said latter tower.

3. Process according to claim 1, wherein suitable extractors are used to control the speed of delivery of the treated vegetable materials at the lower ends of the towers in order to control the time of the reactions of the vegetable materials introduced at the tops of said towers, and intermediate inlet ducts in the walls of the towers are used to introduce the steam and the chemical reagents, while a washing and separating container having an outlet duct for the lye is used beneath the impregnation tower for washing the initially treated vegetable material from said tower and recovering the excess lye from said material, and wherein also elevating means are used to raise the washed material from the lower part of the impregnation tower to a hopper above the top of the chlorination tower.

UMBERTO POMILIO.